Oct. 20, 1931.   R. K. MOORE   1,827,898
VEHICLE FOR HIGHWAY AND RAILWAY TRAVEL
Filed Nov. 10, 1930   3 Sheets-Sheet 2
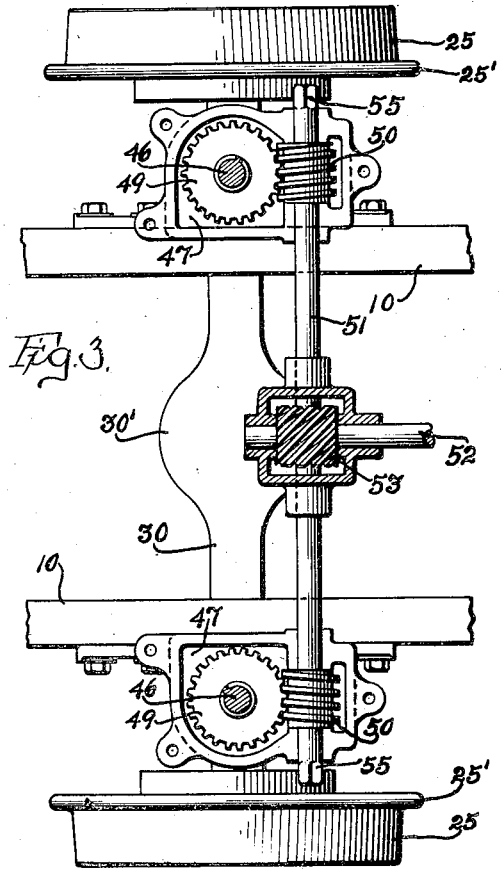
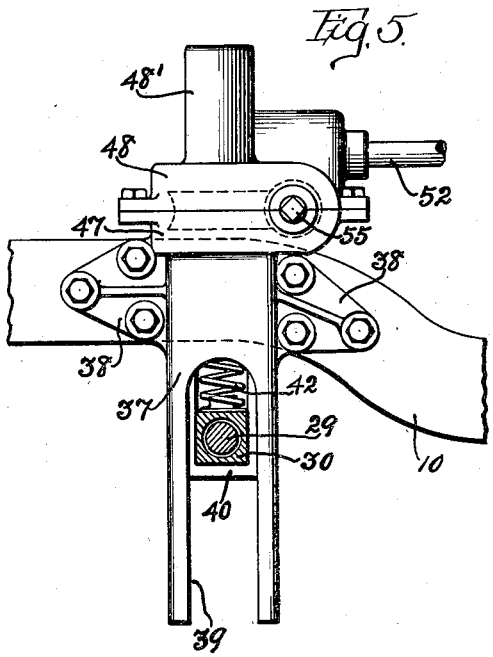
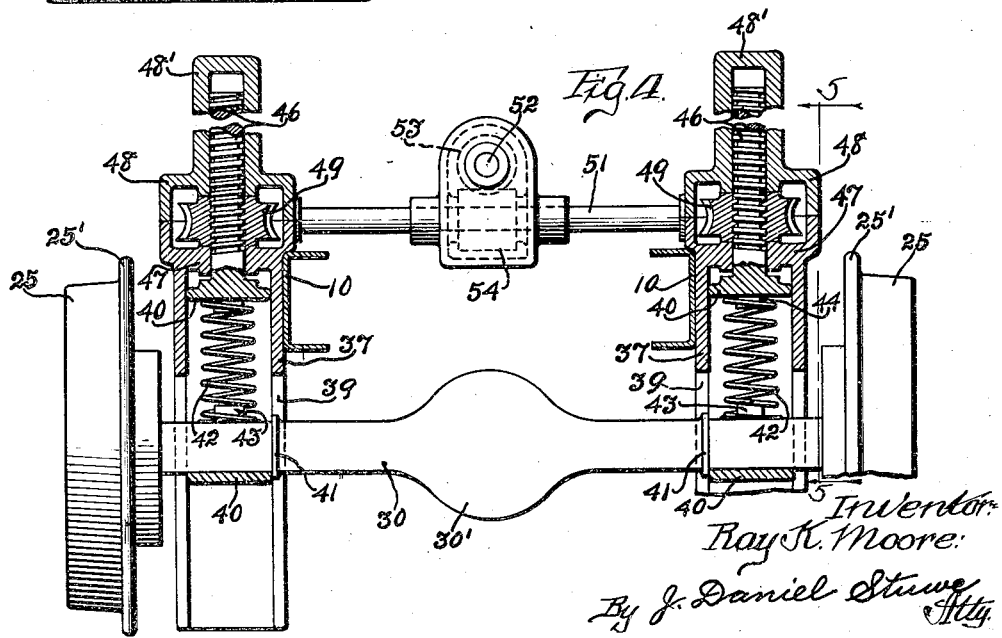

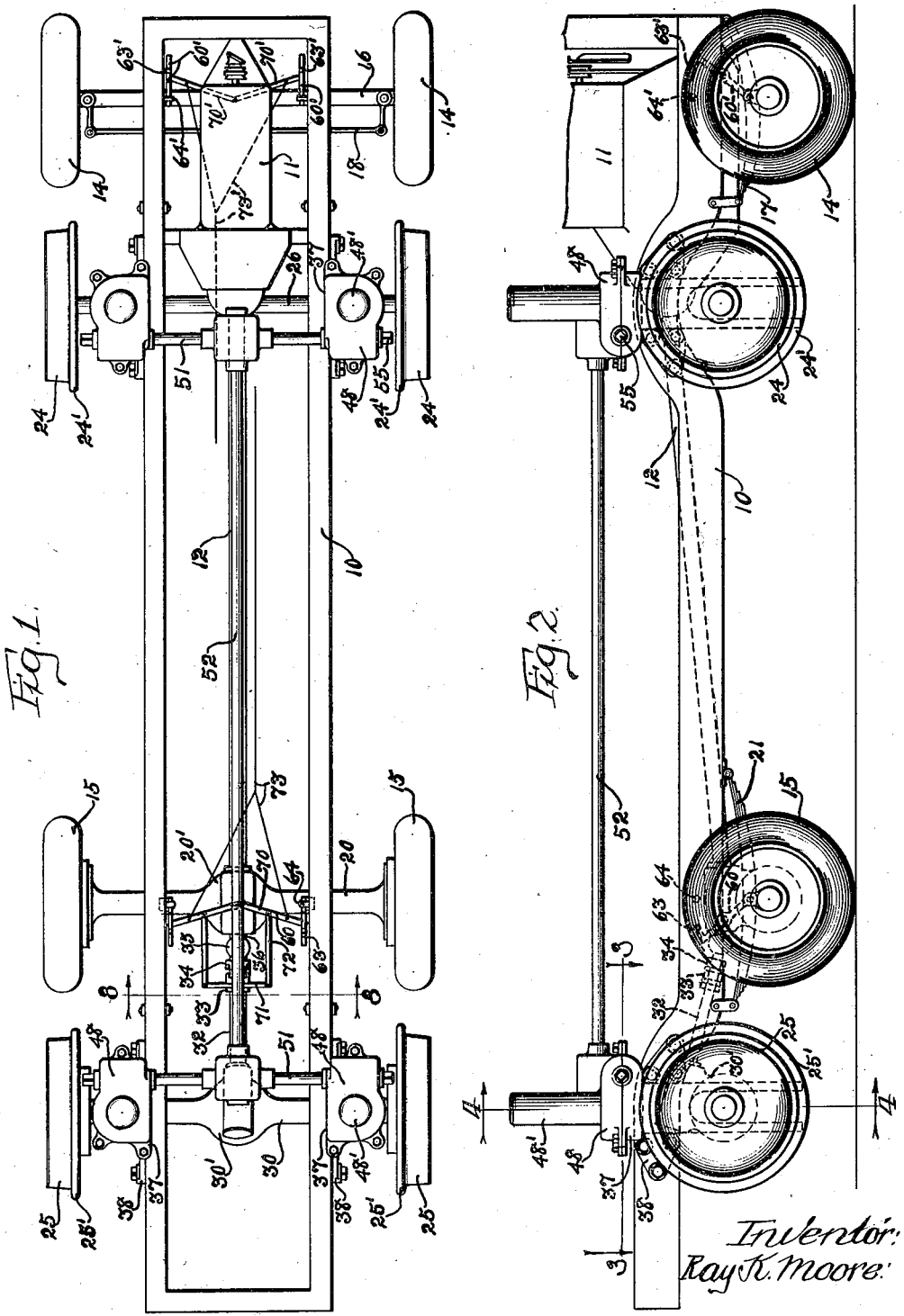

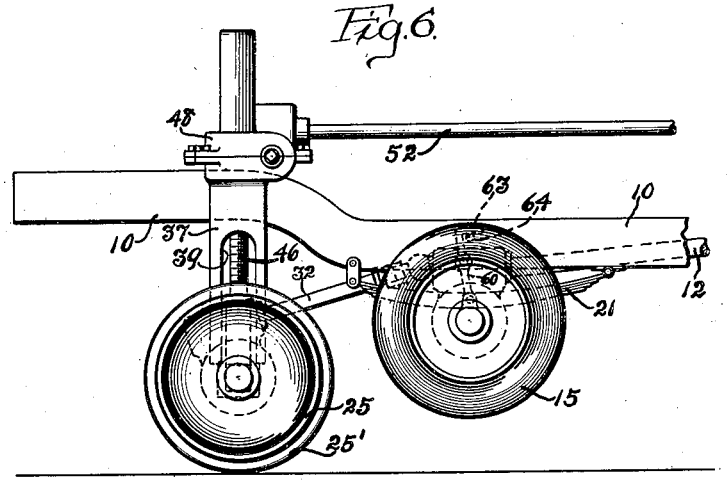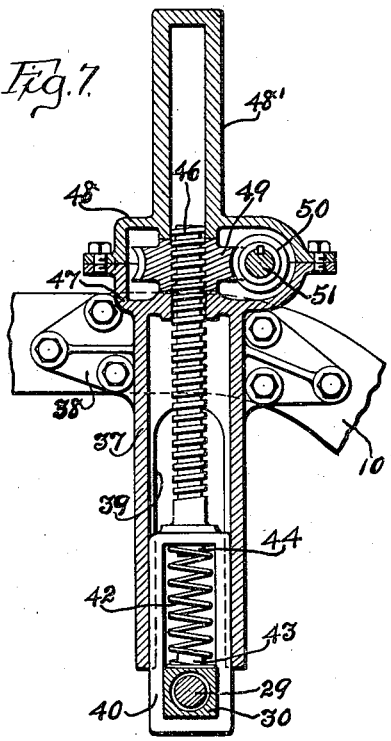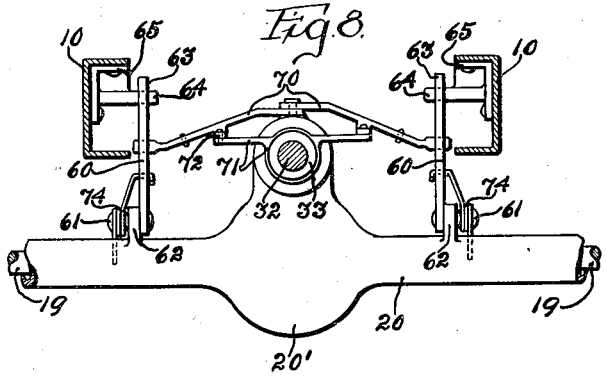

Patented Oct. 20, 1931

1,827,898

UNITED STATES PATENT OFFICE

RAY K. MOORE, OF FREEPORT, ILLINOIS, ASSIGNOR OF ONE-HALF TO WILLIAM J. LAFFEY, OF CHICAGO, ILLINOIS

VEHICLE FOR HIGHWAY AND RAILWAY TRAVEL

Application filed November 10, 1930. Serial No. 494,628.

This invention relates to improvements in vehicles for highway and railway travel.

The main object of this invention is to provide a vehicle which is adapted for traveling on the railway, for rapid transportation and long hauls; and which is also adapted for traveling on the highway, for direct delivery of the transported material at the destination. For this purpose the construction of the vehicle preferably includes shaft means with a set of railway wheels, and shaft means with a set of highway wheels, and means for readily adjusting one of the sets into and the other set out of vehicle-supporting position.

Another object of this invention is to provide such a vehicle with two sets of wheels, and means for moving all of the wheels of one set simultaneously vertically with respect to the other set, whereby either set may be utilized for supporting and propelling the vehicle.

These and other objects and advantages are attained with this invention, as will become apparent from the following description, taken in connection with the accompanying drawings, in which,—

Fig. 1 is a plan view of a vehicle chassis embodying my invention in its preferred form of construction.

Fig. 2 is a side elevational view thereof, showing the highway wheels in the supporting position and the railway wheels elevated.

Fig. 3 is an enlarged horizontal sectional view, taken substantially on line 3—3 of Fig. 2.

Fig. 4 is an enlarged vertical sectional view, taken on line 4—4 of Fig. 2.

Fig. 5 is an elevational view, partly in section, taken along line 5—5 of Fig. 4, showing in the raised position the axle shaft and means for adjusting it.

Fig. 6 is a partial side elevational view, showing the railway wheel in the supporting position and the highway wheel suspended.

Fig. 7 is a vertical sectional view, showing the axle shaft and the means for adjusting it located in the lower position.

Fig. 8 is an enlarged vertical sectional view, taken substantially on line 8—8 of Fig. 1, showing the means for simultaneously operating the clutch for driving the railway wheels, and the catch for holding the highway wheels elevated.

In the drawings my invention is illustrated in its preferred form of construction, as applied to the chassis of a motor vehicle which includes a frame 10 carrying a motor 11 and a drive shaft 12 driven thereby, in the usual and well known manner.

The vehicle is provided with two sets of wheels, a set of railway wheels, to adapt the vehicle for traveling on the railways, which is preferable during long hauls; and a set of highway wheels, to adapt the vehicle for traveling on the highways of the city and country, to make delivery of the transported material directly at the place of business or the exact destination; and this vehicle is furthermore provided with means for readily adjusting one set of wheels vertically relative to the other set, so that either set may be used in supporting and transporting the vehicle. This vehicle thus avoids the customary reloading of the material from the usual railway car to the highway truck for its delivery at the place of final destination.

In my improved vehicle the set of highway wheels preferably comprises a pair of front wheels 14 and a pair of rear wheels 15, which preferably are the usual pneumatic tire wheels. The front wheels 14 are mounted on a front axle or axle shaft 16 which is resiliently mounted by spring means 17 under the front end of the vehicle, in any approved manner, the wheels being guided by suitable steering means 18. The rear wheels 15 are secured in the usual manner on the rear axle shaft or axle means 19 which is rotatably mounted in the axle housing 20 which is resiliently mounted by spring means 21 under the rear part of the frame, said axle means and wheels being driven by the drive shaft 12 and the usual differential mechanism housed in the differential casing 20' on the axle housing 20, in any approved and well known manner.

In the form of my invention illustrated herein the set of railway wheels comprises a pair of front wheels 24 and a pair of rear wheels 25, said wheels being provided with inner flanges 24' and 25' to adapt them especially for travel on the railway. The front wheels are mounted on a front axle or axle shaft 26, and the rear wheels are mounted on a rear axle shaft or axle means 29 which is rotatably carried in an axle housing 30 which is preferably provided with suitable differential mechanism located in the differential casing 30' at the center of the axle housing. An auxiliary drive shaft 32 carries a clutch member 33 to rotate with the shaft and to slide thereon into engagement with a clutch member 34 provided on a universal joint 35 positioned on the rear end of a stub shaft 36 extending rearwardly from the differential casing 20', so as to rotate said auxiliary drive shaft 32 with drive shaft 12, for driving the railway wheels 25 to propel the vehicle.

The means for mounting the railway wheels, so as to be adjustable vertically on the vehicle and relative to the highway wheels, preferably comprises a plurality of guide members or casings 37 secured to the frame, including a front pair and a similar rear pair positioned at the front and at the rear railway axles and adjacent the wheels. Said guide casings are constructed similarly, and each has a pair of ears or brackets 38 secured with suitable bolts to the outer side of the frame. Each casing has an aperture or slot 39 provided in each side adjacent its lower end, wherein the axle housing 30 is slidable vertically. An axle carrying member or cage 40 is mounted in each guide casing to slide vertically therein, each cage having two opposite sides open so as to register with said apertures 39, and the outer part of an axle housing 30 extends through the two open sides and through the two apertures 39, to be movable vertically therein, and to rest on the lower end of the cage when the axle means and wheels are elevated. A pair of annular flanges 41 on the housing engages the inner sides of the cages to retain the parts laterally in position. A spring 42 is provided in each cage and is confined between the axle housing and the top of the cage, the spring being held in place by lugs 43 and 44 on the housing and on said top.

The operating means for adjusting the railway wheels and axle means preferably comprises a threaded stem or shaft 46 arising from the top of each cage 40 and extending slidably through an opening provided in the top wall 47 of casing 37. A cap 48 is removably mounted on said top wall and has a tubular top part or hood 48' thereon for receiving and protecting the threaded stem 46 when elevated, as best shown in Fig. 4. A worm gear 49 is mounted in said cap and is threaded on said stem, being actuated by a worm 50 secured on a cross-shaft 51, each shaft carrying a pair of worms 50, for moving a pair of stems and cages and an axle housing with a pair of wheels vertically, there being a front and a rear cross-shaft 51 positioned adjacent the front and the rear pairs of wheels 24 and 25. A longitudinally extending operating shaft 52 has a gear 53, preferably a forty-five degree gear, secured adjacent each of its two ends, each of which engages a similar gear 54 secured centrally on the front and the rear cross-shafts 51.

This shaft and gear arrangement causes all the threaded stems with the cages and axle means and railway wheels to be moved vertically in unison so as to be brought simultaneously into engagement with the railway and to be simultaneously elevated therefrom, in order to make the change from one form of wheels to the other by holding the frame and vehicle in a level position.

The mechanism is arranged so that one person or more than one person can be active in adjusting the railway wheels vertically, and for that purpose the ends 55 of each of the two cross-shafts 51 are made angular in cross-section, to enable the application of one or more than one suitable cranks or tools for rotating said shaft 51 and actuating the cages and axle means thereby.

Means is provided for holding the highway wheels and the axle means thereof steady in the suspended position, and to prevent sagging and bobbing thereof on the springs 17 and 21. Said means preferably includes a pair of levers 60 pivoted with pin 61 on lugs 62 provided on the axle housing 20, each lever having a catch or hook 63 at its upper end adapted to hook over a finger 64 extending from a bracket 65 secured on the frame. Said means also includes a pair of levers 60' pivoted to the front axle 16, and having hooks or catches 63' engaging over fingers 64' mounted on the frame, similar to the above described like elements adjacent the rear highway wheels.

Means is provided for simultaneously operating the clutch member 33 and the catches, said means preferably including a pair of levers 70, each being pivoted to the axle housing and engaging one of the levers 60; and a similar pair of levers 70' which are pivotally mounted centrally over the front axle and are connected to the pair of levers 60'. A yoke 71 engages the clutch member 33, and a pair of links 72 are connected to said yoke and to the levers 70. A cable 73 is attached to levers 70, and a similar cable 73' is attached to levers 70', for actuating the levers and the clutch in unison with the catches; so that when the cables 73 and 73' are drawn together, which may be done from the driver's cabin or any convenient place, the catches are moved into catching position on the fingers on the frame so as to retain the highway wheels and axle shafts fixed in suspended positions on the frame, and at the same time engaging clutch member 33 with clutch member 34, so that the rear axle means 29 and the railway wheels thereon are driven along with shaft 12, as soon as the railway wheels are lowered into the operative position thereby elevating the highway wheels and the frame, as indicated in Fig. 6. A spring 74 is preferably also provided and is mounted on pin 61, for urging levers 60 into the release position, to release the catch members and the clutch means thereby.

Although I have shown my invention in the preferred form of construction, it is to be understood that various changes may be made herefrom without departing from the spirit of this invention, and that I do not desire to be limited hereby, except as necessitated by the prior art.

I claim as my invention:

1. A vehicle comprising a set of highway wheels including front and rear wheels and axle means therefor, a set of railway wheels including front and rear wheels and axle means therefor, a plurality of double ended transversely extending operating shafts and worm gear means for adjusting in unison all the wheels and axle means of one set vertically relative to those of the other set and to retain the same in adjusted position whereby to selectively utilize either set of wheels for supporting the vehicle, and means at the ends of said shafts whereby said shafts and the wheels may be adjusted vertically by one person and also by more than one person.

2. A vehicle comprising a set of highway wheels and a set of railway wheels, each set including front and rear wheels and axle means therefor, said two sets of wheels being mounted in substantial alinement so as to travel on the same pair of tracks, means for propelling an axle means and wheels thereon of each set, and means for adjusting in unison all the wheels and axle means of one set vertically relative to those of the other set and to retain the same in the adjusted position, whereby to utilize either set of wheels and axle means for supporting and propelling the vehicle.

3. A vehicle comprising a set of highway wheels, means for driving a pair of said set of wheels, a set of auxiliary wheels being flanged for travel on the railway, driving means and means for connecting it with the first driving means, for driving a pair of the set of railway wheels, means for adjusting one set of wheels vertically with respect to the other, whereby to utilize either set for supporting and propelling the vehicle, holding means for retaining one set of wheels elevated, and means for automatically disconnecting said connecting means when said holding means is released.

4. A vehicle comprising a set of highway wheels and a set of railway wheels, drive means for driving one of said sets, drive means for the other set of wheels, means for coupling the two drive means to drive both sets of wheels thereby, means for adjusting one set of wheels either higher or lower than the other set in order to use either set for supporting and propelling the vehicle, and means for automatically moving the coupling means out of operation and for manually moving it into operation.

5. A vehicle comprising a set of highway wheels and a set of railway wheels, drive means for driving one of said sets, drive means for the other set of wheels, clutch means for coupling the two drive means to drive both sets of wheels, means for adjusting one set of wheels either higher or lower than the other set in order to use either set for supporting and propelling the vehicle, catch means for retaining said other set of wheels in the elevated position, and means for simultaneously operating said clutch means and said catch means.

6. A vehicle comprising shaft means and highway wheels thereon, means for driving said shaft means and wheels, shaft means and railway wheels thereon, means including a clutch connectible with said drive means whereby to drive said shaft means with the railway wheels thereon, means for selectively moving said shaft means with the railway wheels either higher or lower than the shaft means with the highway wheels, for utilizing either shaft means with its wheels for supporting and propelling the vehicle, catch means for retaining said highway wheels and shaft means elevated, and means for simultaneously operating said clutch and said catch means.

7. A vehicle comprising a frame having shaft means and a set of wheels and means for resiliently supporting the vehicle thereon, another shaft means and set of wheels for supporting the vehicle, guide means on the frame, cages slidable vertically in said guide means, means to support said cages resiliently on the last said shaft means, and means to positively adjust said cages with their shaft means and wheels thereon vertically in said guide means, whereby to position either set of wheels in the road engaging position.

8. A vehicle comprising a frame, shaft means and a set of wheels thereon and means for resiliently supporting the frame on the shaft means, other shaft means and a set of wheels thereon for supporting the frame, guide means on the frame, cages having the last said shaft means extending therethrough and resiliently retained and being slidable vertically in the guide means, and shaft and gear means connected with said cages and guide means to adjust the cages and the associated shaft and wheel means and to retain them in the adjusted position, whereby to utilized either set of wheels for supporting the vehicle.

9. A vehicle comprising a frame, shaft and wheel means for supporting the same, and including a pair of shaft members and a pair of wheels on each shaft member, guide casings secured on the frame and having side apertures, a cage slidable vertically in each casing and having open sides registering with said apertures, means for resiliently retaining each shaft member in a pair of said cages and so as to be slidable in the apertures and the open sides, and a threaded shaft on each cage and a gear in each casing for adjusting said cages and shaft members with their wheels vertically on the frame and to hold them in the adjusted position.

10. A vehicle comprising a frame, shaft and wheel means for supporting the same and including a pair of shaft members and a pair of wheels on each shaft member, a guide casing secured on the frame and having side apertures, a cage slidable vertically in each casing and having openings in its opposite sides which register with said apertures, means for resiliently retaining each shaft member in a pair of said cages so as to be slidable in the apertures and the openings, a threaded shaft and gear means associated with each cage and casing for adjusting said cages and shaft members with the wheels thereon vertically on the frame, and means for operating in unison all of said shaft and gear means and thereby adjusting all the wheels vertically.

11. A vehicle comprising a frame, sets of wheels and shaft members on the frame, one set to be used for highway travel and the other set for railway travel, means for driving the highway wheels and shaft members, spring means for supporting the frame resiliently on said highway shaft members and wheels, guide means on the frame, a cage slidable vertically in each guide means, a shaft member with railway wheels thereon extending through a pair of cages and guide means, means for adjusting said cages and shaft members vertically to place the railway wheels higher or lower than the highway wheels, means to move both shaft members with railway wheels vertically in unison, drive means including a clutch connectible with the first said drive means to drive the railway shaft members and wheels thereby, and catch means to support the highway shaft members and wheels on the frame while the railway shaft members and wheels are used to support and operate the vehicle.

12. The mechanisms set forth in claim 11, and further provided with means to simultaneously operate said clutch and said catch means to place both in the operative position.

In testimony whereof I have signed this specification.

RAY K. MOORE.